United States Patent

Nishio et al.

[11] Patent Number: 5,984,816
[45] Date of Patent: Nov. 16, 1999

[54] TOOTHED POWER TRANSMISSION BELT AND DRIVE SYSTEM USING THE POWER TRANSMISSION BELT

[75] Inventors: Hiroyuki Nishio, Hyogo; Kuniharu Uto, Kagawa; Takahide Mizuno, Kobe; Yoshihisa Fujita, Kobe; Akira Kawaguchi, Kobe; Hideaki Tanaka, Kobe, all of Japan

[73] Assignee: Mitsuboshi Belting Ltd., Hyogo, Japan

[21] Appl. No.: 08/885,758

[22] Filed: Jun. 27, 1997

[51] Int. Cl.⁶ .............. F16H 7/02; F16G 13/02; F16G 9/00
[52] U.S. Cl. .............. 474/153; 474/207; 474/263
[58] Field of Search .............. 474/87, 148, 153, 474/205, 207, 263, 265, 266, 268, 900

[56] References Cited

U.S. PATENT DOCUMENTS

| | | | |
|---|---|---|---|
| 4,793,131 | 12/1988 | Mizuno et al. | 57/243 |
| 4,915,674 | 4/1990 | Tanaka et al. | 474/153 |
| 5,328,416 | 7/1994 | Gregg | 474/153 |
| 5,387,160 | 2/1995 | Nakajima et al. | 474/205 |
| 5,421,789 | 6/1995 | Gregg | 474/153 |
| 5,421,927 | 6/1995 | Macchiarulo et al. | 156/138 |
| 5,498,214 | 3/1996 | Macchiarulo et al. | 474/268 |
| 5,518,460 | 5/1996 | White, Jr. et al. | 474/153 |
| 5,545,097 | 8/1996 | Kitazumi et al. | 474/266 |
| 5,562,557 | 10/1996 | Ledvina et al. | 474/900 |
| 5,662,541 | 9/1997 | Roovers | 474/153 |
| 5,853,849 | 12/1998 | Nishio et al. | 428/143 |

FOREIGN PATENT DOCUMENTS 54-135954   4/1978   Japan.

*Primary Examiner*—Tamara L. Graysay
*Assistant Examiner*—Matthew A. Kaness
*Attorney, Agent, or Firm*—Wood, Phillips, VanSanten, Clark & Mortimer

[57] ABSTRACT

A drive system having a belt with a length and a plurality of teeth spaced regularly along the length of the belt and a first pulley having a plurality of grooves for receiving the belt teeth with the belt and first pulley in operative relationship. The single pitch difference between the belt teeth and the grooves in the first pulley is between −0.04 mm and 0 mm.

14 Claims, 14 Drawing Sheets

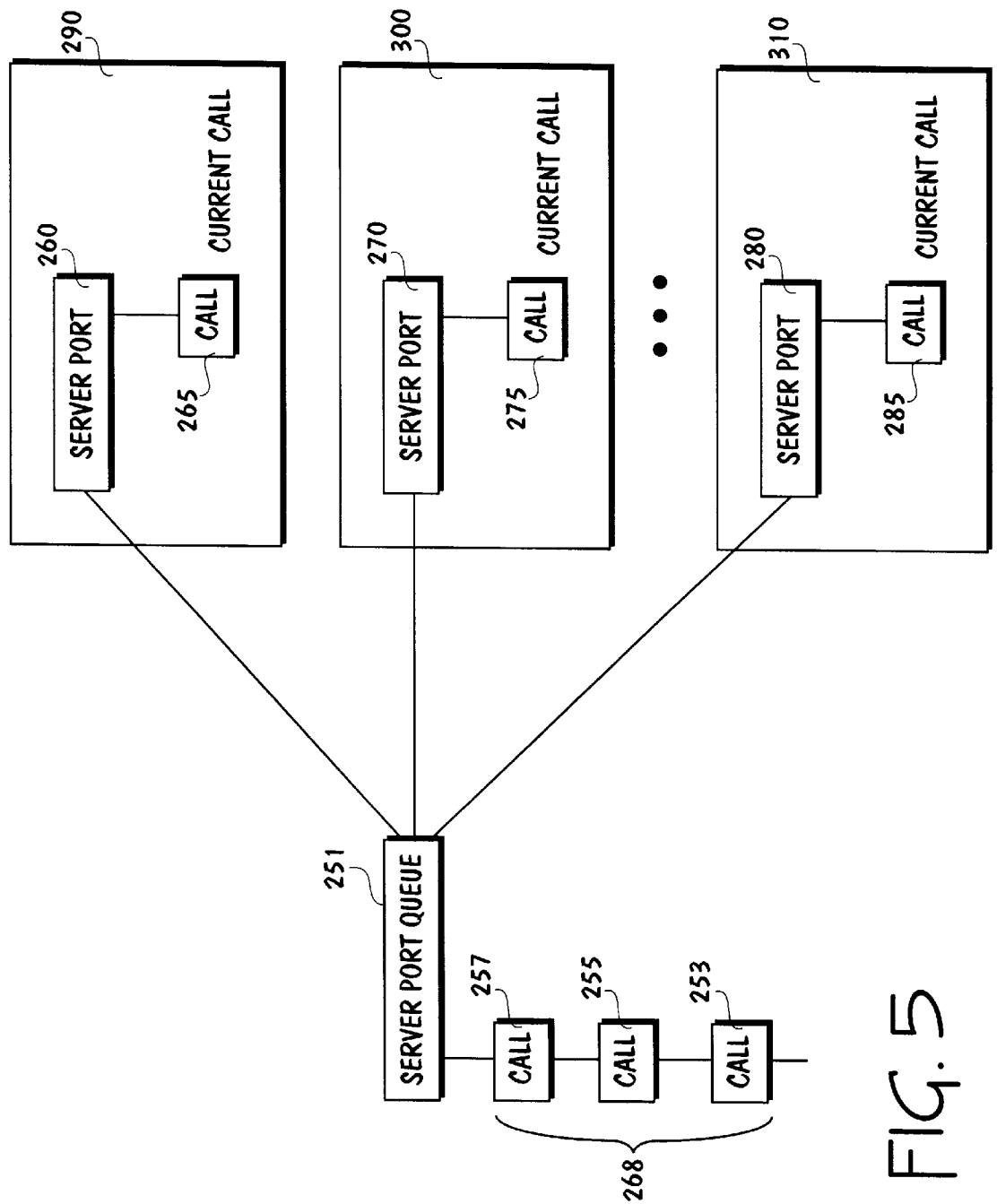

TOOTHED POWER TRANSMISSION BELT AND DRIVE SYSTEM USING THE POWER TRANSMISSION BELT

BACKGROUND OF THE INVENTION

1. Field of the Invention

This invention relates to power transmission belts and, more particularly, to a toothed power transmission belt which drives/is driven by a grooved pulley either one way in a predetermined path or in a reciprocating motion.

2. Background Art

Printer carriage belts, bank note conveyor belts, card conveyor belts, and other types of conveyor belts are commonly made using a toothed construction.

The common difference for the single pitch error for the belt teeth, which is calculated by measuring the length of the pitch circle or the length of the center distance, is not controlled for the belts in the above-identified environment. Similarly, the common difference for the single pitch error of teeth on a cooperating pulley, calculated by determining the outer diameter tolerance, is not controlled.

It is known to use aramid fiber or glass fiber load carrying cords in this type of belt. One example of an aramid fiber cord is disclosed in Japanese Patent Application Laid-Open No. 54-135954. The cords therein have a twist coefficient of from 1.4 to 2.6 and a thickness of from 300 to 500 denier. It is also known to make aramid fiber load carrying cords by twisting yarns which are defined by twisting a plurality of base yarns together and then applying adhesive thereto. Glass fiber ropes have also been treated with an adhesive in the prior art.

In the conventional belts, described above, the single pitch difference between the single pitch of the belt teeth and the pitch of the pulley grooves is not controlled. If the single pitch difference between the single pitch of the teeth of the belts and the single pitch of the grooves of the pulleys on which the belts are mounted is large, there may be interference between the belt teeth and pulley teeth as the belt teeth move into the pulley grooves in operation. This may produce vibration and/or variation in the belt speed. With the belt being used in a printing application, printing accuracy may be compromised. Travel accuracy may be adversely affected in conveyor systems. Variation in the travel rate may produce adverse effects in other environments in which this type of belt is used which require consistent belt speed.

Additionally, in conventional belt and pulley systems, the height of the belt teeth and the depth of the pulley grooves are normally approximately the same. Since the grooves in this type of system may be relatively deep, the rotational center line of the belt may be influenced by the interference between the belt teeth and pulleys as the belt teeth enter the pulley grooves. This condition is shown generally in FIG. 19 herein. In FIG. 19, a belt 10 is shown in operative relationship to a pulley 12. The belt 10 has teeth 14, 16, 18 which move into and out of grooves 20 on the pulley 12 as the system operates. In this system, one tooth 22 between adjacent grooves 20 on the pulley 12, moves between adjacent teeth 14, 16 and presses a portion 24 of a body 26 of the belt 10 outwardly to produce a relatively sharp bend at 24. As a result of this interference between the belt 10 and pulley 12, undesirable speed variation may result with the belt 10 in use.

It is known to use aramid fibers and glass fibers in load carrying cords in systems which require cords with a high modulus of elasticity. However, when the belts are driven by small motors, or are used as printer carriage belts, bank note conveyor belts, card conveyor belts, and the like, which are not driven with a high torque, the belts made with these fibers may not be as flexible as necessary. These belts may also become highly rigid at low temperatures. As a result, the necessary starting torque and the necessary drive torque for these systems may be undesirably high.

SUMMARY OF THE INVENTION

In one form of the invention, a drive system is provided having a belt with a length and a plurality of teeth spaced regularly along the length of the belt, and a first pulley having a plurality of grooves for receiving the belt teeth with the belt and first pulley in operative relationship. The single pitch difference between the belt teeth and the grooves in the first pulley is between −0.04 mm and 0 mm.

A second pulley can be provided with a plurality of grooves therein for receiving the belt teeth with the belt and second pulley in operative relationship. The belt is trained for movement in a continuous path around the first and second pulleys with the first and second pulleys and belt in the operative relationship. The single pitch difference between the belt teeth and the grooves in the second pulley is between −0.04 mm and 0 mm.

The single pitch difference between the belt teeth and the grooves in the first pulley may be between −0.02 mm and 0 mm.

In one form, the belt has an inside and an outside, the teeth on the belt have a height between the inside and outside of the belt, the first pulley has a rotational axis, the grooves in the first pulley have a depth in a radial direction relative to the rotational axis of the first pulley, and the ratio of the height of the belt teeth to the depth of the grooves in the first pulley is between 1.00 and 1.20.

The belt teeth and the grooves may each have a trapezoidal shape as viewed in cross section.

In one form, the belt has a body and there are load carrying cords embedded in the body and extending in a lengthwise direction. The cords may be aramid fibers. In one form, the cords are defined by at least one bundle of monofilament aramid fibers, each of 0.5 to 2.0 denier, that are single twisted to produce load carrying cords having a diameter of 0.10 to 0.20 mm.

The load carrying cords have centers spaced laterally of the belt body. In one form, the lateral spacing between the center of adjacent cords is between 0.2 mm and 0.5 mm.

In one form, there is a cloth layer on the belt teeth, which cloth layer has openings therethrough. The cloth layer is treated with a substance that substantially blocks the openings in the cloth. In one form, the treating substance is resorcinol-formalin-latex.

The cloth layer may be a canvas that is at least one of 6-nylon, 66-nylon, polyester, and aramid fiber.

In one form, the cloth is treated only with resorcinol-formalin-latex, which is applied as a liquid and adhered in an amount equal to 20–50% by weight.

In one form, the belt body is defined at least partially by a rubber that is at least one of chloroprene rubber, natural rubber, millable urethane rubber, hydrogenated nitrile rubber, chlorosulfonated polyethylene (CSPE), and alkylated chlorosulfonated polyethylene (ACSPE).

In another form, a power transmission belt is provided having: a body with a length, an inside, an outside, laterally spaced sides, and teeth spaced regularly along the belt body; and load carrying cords embedded in the body and extending lengthwise of the belt body and comprising at least one bundle of monofilament aramid fibers each of 0.5 to 2.0 denier that is single twisted. The load carrying cords each have a center with the center of the load carrying cords being spaced laterally of the belt body between 0.2 mm and 0.5 mm. A cloth layer is provided on the teeth.

A drive may be provided for at least one of the pulleys that at least one of a) rotates the at least one pulley in one direction and b) moves the at least one pulley in a reciprocating path.

Several objectives may be realized by practicing the present invention. By controlling the single pitch difference between the belt teeth and the pulley grooves and the relationship between the height of the belt teeth and the depth of the pulley grooves, a system can be provided to move a toothed belt consistently and precisely in a predetermined path and at a constant speed, making the system suitable for printer carriage belts, bank note conveyor belts, card conveyor belts, and the like. According to the invention, a belt can be constructed to achieve the above objectives even in a low temperature environment. This makes possible relatively low starting and operating torques for the system.

BRIEF DESCRIPTION OF THE DRAWINGS

FIG. 5 is a graph showing the relationship between the system loading and speed variation for three belts, according to the present invention, having different ratios of height of belt teeth to depth of pulley grooves;

DETAILED DESCRIPTION OF THE DRAWINGS

Figure 1:
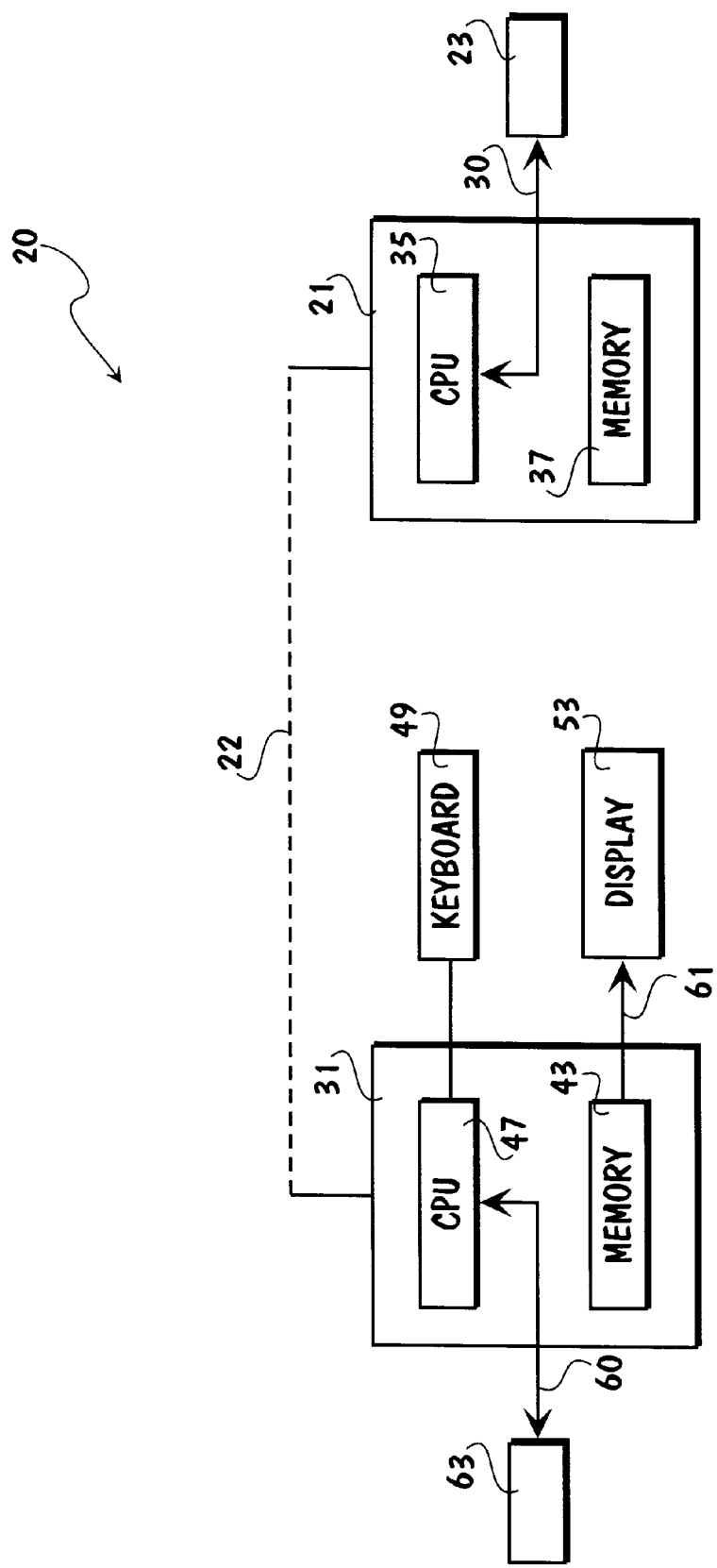
FIG. 1 is a fragmentary, cross-sectional view of toothed belt according to the present invention.
Figure 2A:
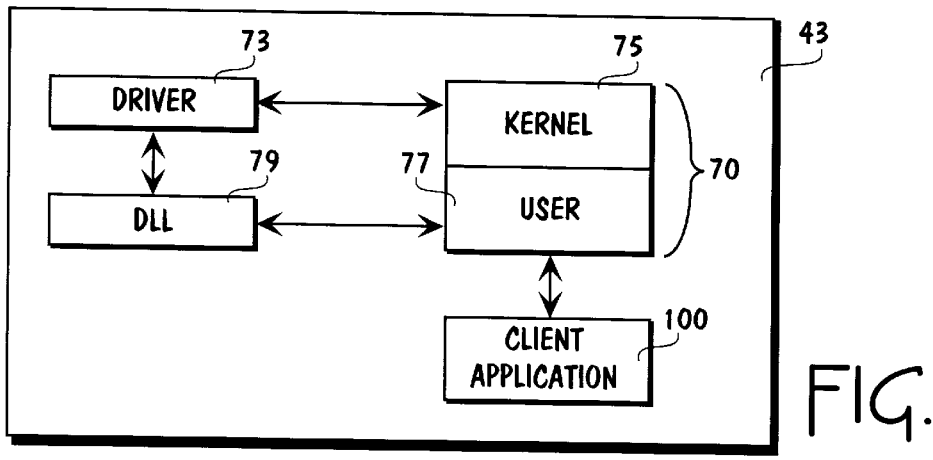
FIG. 2 is a fragmentary, cross-sectional view of a toothed pulley, according to the present invention, with which the belt of FIG. 1 can be operatively engaged.
Figure 2B:
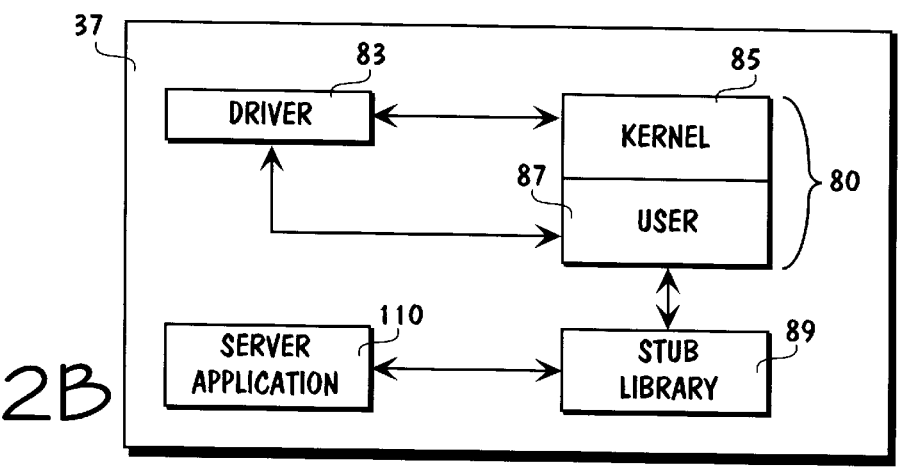
Figure 2C:
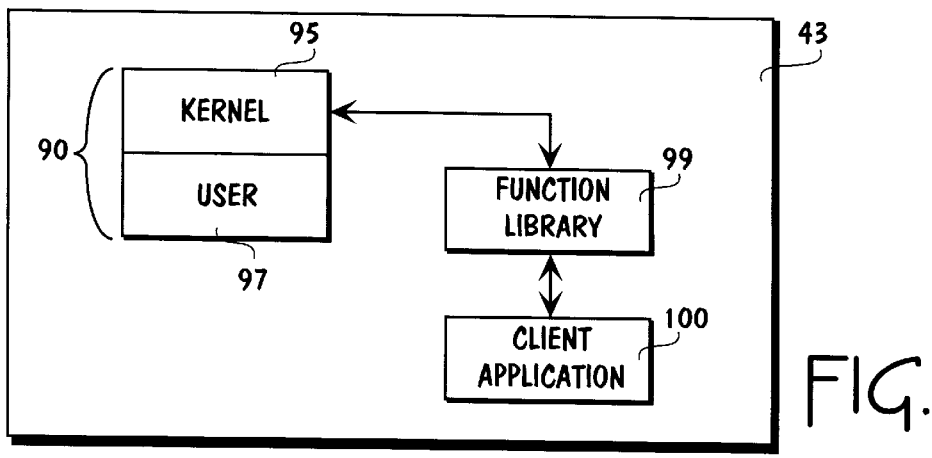
Figure 3:
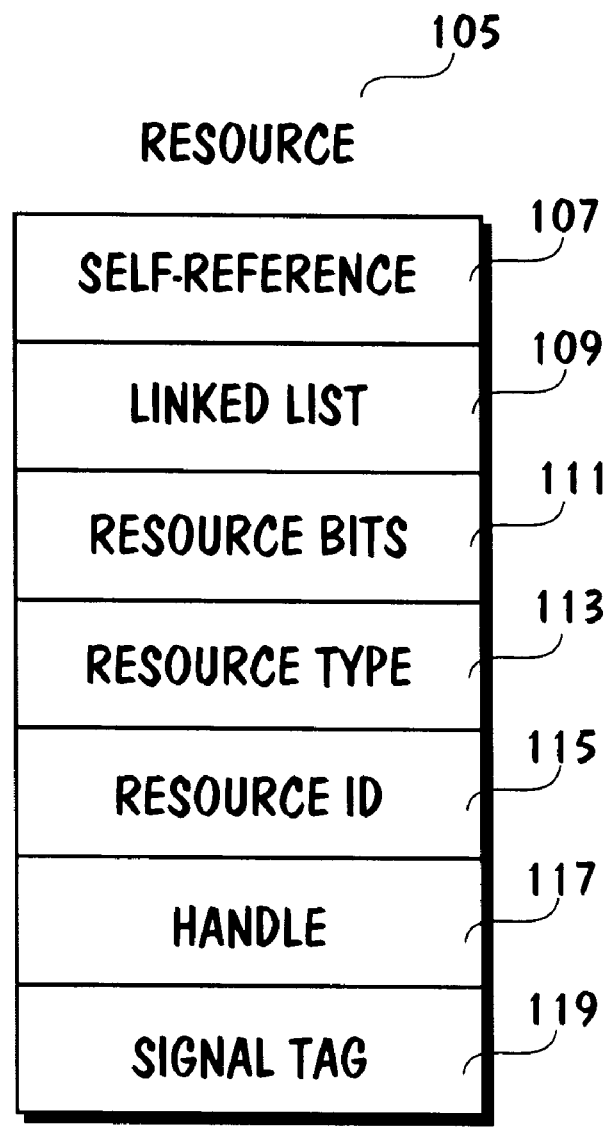
FIG. 3 is a fragmentary, perspective view of the belt in FIG. 1.

In FIGS. 1–3, a toothed belt 30 and toothed pulley 32, as make up one form of the inventive drive system, are shown. The belt 30 has a body 34 with a length in the direction of the double-headed arrow 36 and a width (W) between laterally spaced sides 38, 40. The belt 30 has an inside 41 and an outside 42, with their being a plurality of trapezoidally-shaped teeth 44 spaced regularly along the length of the belt body 34.

The pulley 32 has a plurality of teeth 46 spaced regularly around the circumference thereof with their being trapezoidally-shaped grooves 48 between adjacent teeth 46.

With the belt 30 and pulley 32 in operative relationship, the teeth 44 on the belt 30 move serially into the pulley grooves 48 and are driven by the pulley teeth 46 around the rotational axis 50 for the pulley 32. The belt 30 is trained around a second pulley, shown schematically at 52 in FIG. 2, so that the belt 30 moves continuously in an endless path around the pulleys 32, 52. A drive 53 rotates one of the pulleys 32, 52 either continuously or in a reciprocating path.

The single pitch (P1) between adjacent teeth 44 and the single pitch (P2) for the grooves 48 is controlled to have a specific relationship. More specifically, the difference between the single pitch (P1) of the belt 30 and the single pitch (P2) of the pulley 32 is between −0.04 mm and 0 mm, and more preferably between −0.02 mm and 0 mm.

The single pitch difference (single pitch error) between the belt and pulley is represented by the following equation:

Single pitch difference =

(single pitch for belt) − (single pitch for pulley)

The single pitch for the belt =

[(center distance)/(number of teeth of belt − number of teeth of sizing pulley)] × 2

The single pitch for the pulley =

[(outer diameter of pulley + 2 $PLD$) × $p$)]/number of pulley teeth

In this calculation, $PLD = 0.254$ mm, with the number of teeth being 10.

It has been found that if the single pitch difference between the belt and pulley is smaller than −0.04 mm, the speed variation for the belt is significant, resulting in reduced accuracy, as with the belt used in a printing environment. Also, the accuracy of the belt path is compromised. If the single pitch difference between the belt and pulley is greater than 0 mm, speed variation is significant, with the same detrimental effect noted above. It has been found that precise belt travel and speed consistency are optimized with the single pitch difference between the belt and pulley in the range of −0.02 mm and 0 mm. Optimal accuracy with the belt in a printing environment has been found to occur in this same range.

Figure 19:
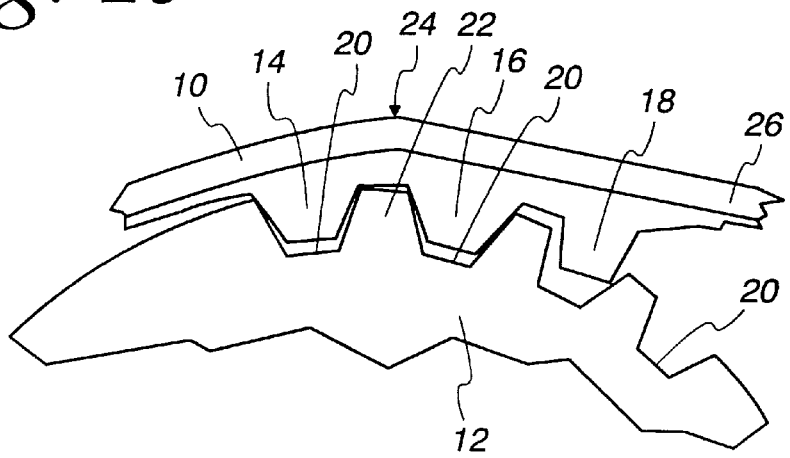
FIG. 19 is a fragmentary, elevation view of a conventional toothed belt and pulley in operative relationship.

The relationship between the height Hi of the belt teeth 44 and the depth H2 of the pulley grooves 48 has a significant effect on speed variation. It has been found that the optimal ratio of the height of the belt teeth 44 to the depth of the pulley grooves 48 is between 1.00 and 1.20. In most systems in which the present invention would be utilized, the depth of the pulley grooves is relatively small compared to conventional systems. With the belt 30 and pulley 32 in operative relationship, the distance between the bottom 54 of each groove 48 and the tip 56 of each tooth 44 is kept relatively large, with the result that the rotational center line of the belt 30 operatively engaged with the pulley 32 is relatively high, to thereby avoid the polygonal distortion, as shown at 24 in FIG. 19 of the prior art. Further, the position of the rotational center line C of the belt 30 does not vary much in the vertical direction, as a result of which speed variation is relatively low.

On the other hand, if the ratio of the height of the belt teeth 44 to the depth of the pulley grooves 48 is more than 1.2, the contact area between the belt 30 and pulley 32 becomes too small, with the result being that power delivered to the belt teeth 44 is lowered, which may cause the belt 30 to jump. Accordingly, it is desirable that the ratio of the height of the belt teeth 44 to the depth of the pulley grooves 48 falls within the range of 1.00 and 1.20, as is demonstrated in FIG. 5.

As previously noted, both the teeth 44 and grooves 48 have a trapezoidal shape in cross section taken lengthwise of the belt 30. In FIG. 1, the oppositely facing tooth ends 58, 60, spaced lengthwise of the belt 30, are each partially planar. Similarly, the facing surfaces 62, 64 bounding each pulley groove 48, are partially planar.

The belt body 34 has a back portion 66 in which laterally spaced, load carrying cords 68 are embedded. A cloth layer 70 is adhered on the inside of the belt 30 over the teeth 44 and over the grooves 72 on the belt between adjacent teeth 44.

The belt teeth 44 and back portion 66 are preferably made from rubber. The rubber may be chloroprene rubber, natural rubber, millable urethane rubber, hydrogenated nitrile rubber, chlorosulfonated polyethylene (CSPE), alkylated chlorosulfonated polyethylene (ACSPE), etc. For the hydrogenated nitrile rubber, it is preferred that the degree of hydrogenation be 80% or more, and more preferably 90% or more, in order to have good heat and ozone resistant characteristics. Hydrogenated nitrile rubber having a degree of hydrogenation of less than 80% may not have adequate heat and ozone resistance.

The rubber may be treated with an additive such as carbon black, zinc flower, stearic acid, plasticizers, antioxidants, and vulcanizing agents, such as sulfur and organic peroxide. The additives and vulcanizing agents described above should not be viewed as limiting.

The cloth layer 70 is a canvas cloth, which may be made of one, or a combination, of 6-nylon, 66-nylon, polyester, aramid fiber, or the like. The warp (in the widthwise direction of the belt) and the weft (in the lengthwise direction of the belt) defining the cloth layer 70 may be made of filament yarns or spun yarns of the above mentioned fibers. The cloth layer 70 may be a plain weave, twill weave, or satin fabric. Preferably, the weft is made at least partially from elastic woolly nylon yarns, elastic urethane yarns, or blended twisted yarns of elastic urethane and nylon.

With the cloth layer 70 being a plain weave fabric, the weft and warp intersect alternatingly up and down. Accordingly, there are wave intersections throughout both in the weft and warp directions.

With a twill weave or satin weave fabric, the weft and warp have wave-type intersections at intervals, i.e. other than at every intersection. The total number of wave intersections in the twill and satin weave canvas is smaller than a plain weave canvas cloth. As result, rubber can fully penetrate into the twill and satin weave canvas cloth not only through the spaces between the yarns but also between the intersections of the weft and the warp. Because of this, with the twill weave and satin weave canvas cloth, direct contact between the weft and warp in the cloth can be avoided, even with the belt bent in use. As a result, the twill and satin weave canvas cloths are preferred as the tooth covering, in that they generally contribute to a belt having a longer life.

The cloth defining the layer 70 is processed with a resorcinol-formalin-latex liquid (RFL liquid). The RFL liquid is a mixture made by mixing a precondensate of resorcinol and formalin with latex. The latex may be styrene-butadiene-vinylpyridine ter-copolymers, hydrogenated nitrile rubber, chlorosulfonated polyethylene, epichlorohydrins, etc.

In one preferred form, the cloth in the layer 70 is processed with only RFL liquid. Preferably, the solid amount of the resorcinol-formalin resin adhered to the cloth is between 20 and 50% by weight As a result, the openings 74 defined between the warp and the weft are reduced, and, more preferably, substantially closed, with the result being that the rubber on the inside of the belt 30 is prevented from being exposed through the cloth layer 70, so that rubber dust is prevented from migrating through the cloth layer 70 with the belt in use. Further, the solidified RFL liquid in the cloth layer 70 acts to lower the frictional resistance of the cloth layer, thereby reducing noise produced by the belt 30 in use.

The load carrying cords 68 may be made from aramid fiber. The aramid cords are produced by preparing strands made of 100–400 bundled monofilaments each of 0.5 to 2.0 denier. This permits the belt 30 to remain relatively soft and flexible, even at low temperatures. Further, since aramid fibers have a minus coefficient of linear expansion, the tension of the cords 68 made therefrom is low at temperatures of −35° C.–5° C., thereby potentially requiring low starting and operating torques, making possible the use of small motors. The strands are either single twisted separately or combined into groups of 2 or 3 and single twisted. Strands are twisted from 0 to 100 times per 10 cm to produce a cord having a diameter of 0.10 to 0.20 mm.

It has been found that if the thickness of the monofilaments is less than 0.5 denier, the modulus and rigidity of the cords 68 is reduced. If these cords 68 are used in a belt, the belt is relatively easily elongated, resulting in a reduction of printing and travelling accuracy. These belts may also be more expensive to manufacture. On the other hand, if monofilaments of more than 2.0 denier are used in a load carrying cord that is incorporated into a belt, the rigidity of the belt increases, as a result of which the flexibility thereof is compromised.

If the cord 68 has a diameter of less than 0.10 mm, its modulus is relatively low. When incorporated into a belt, the belt with this type of cord 68 will be elongated relatively easily. Further, its PLD value is low with the result that the period of engagement between the belt and the pulley is lengthened, again thereby lowering printing and travelling accuracy. If the cords 68 have a diameter of greater than 0.20 mm, when incorporated into a belt, the belt may become rigid and lose flexibility. As a result, starting torque for the system may be higher than desired.

The load carrying cords 68 have centers which are preferably spaced laterally in the range of 0.2 mm and 0.5 mm. If the cord center spacing is less than 0.2 mm, the cords could overlap each other during production, potentially resulting in a defective product. If the center spacing is greater than 0.5 mm, the modulus of the belt is lowered and the belt is elongated relatively easily, thereby compromising printing and travelling accuracy for the belt.

The fibers used in the load carrying cords 68 may be made from aramid with an aromatic ring in the main chain of the molecular structure. Examples of suitable commercially available products for the load carrying cords 68 are those sold commercially under the trademarks CONEX™, NOMEX™, KEVLAR™, TECHNORA™ and TWARON™.

The invention makes possible smooth entry of the belt teeth 44 into the pulley grooves 48 with insignificant interference therebetween. As a result of this, speed variation for the belt 30 in operation may be acceptably controlled.

TESTING (INVENTIVE BELTS 1–4 AND COMPARATIVE SAMPLES 1 AND 2)

Each of the belts had teeth with a trapezoidal cross section. Each of the pulleys had complementary trapezoidally-shaped grooves. The belts were of a T80 type, and a size 262T80. The belts had a width of 2.0 mm. A twill weave canvas fabric was used for the cloth layer over the inside of the belts and the teeth. The warp and weft yarns were 80 denier 6-nylon. The warp density was 250 yarns per cm with a weft density of 300 yarns per 5 cm. The fabric was vibrated in water to be shrunk to approximately ½ its original width. The fabric was then dipped in RFL liquid and squeezed through a pair of rollers with a pressure of 0.5 kgf/cm (gauge pressure). The fabric was redipped in the same RFL liquid, squeezed under the same pressure, and dried. The solid content of the RFL was determined to be approximately 20%, calculated as follows: Solid content of resin=(weight of processed cloth−weight of non-processed cloth)/(weight of non-processed cloth)×100(%).

The load carrying cords were prepared as follows. First, a predetermined number of aramid fiber filaments, each having a predetermined diameter, were bundled to form a twisted strand. The filaments were those identified commercially by the trademark TECHNORA™. The strand was single twisted 40 times per 10 cm to prepare a pair of S-twist and Z-twist cords, which were dipped in an adhesive, including an RFL liquid, and dried. The constitution of the load carrying cords is shown in Table I, below.

The canvas cloth prepared above was formed into an endless sleeve and set on a mold. The pair of S-twist and Z-twist cords were alternatingly wound around the sleeve with a center spacing of 0.31 mm (inventive belts 1–3) and 0.44 mm (inventive belt 4) under a tension of 1.0 kg per cord and then vulcanized using conventional pressure vulcanization. The vulcanized sleeve was cut into individual belts of a predetermined width. The belts that resulted each had 262 teeth with a tooth-to-tooth pitch of 2.032 mm. The cross-sectional profile of each tooth was trapezoidal, with the belts being T80 type. The belts were then tested as described below.

Figure 9:
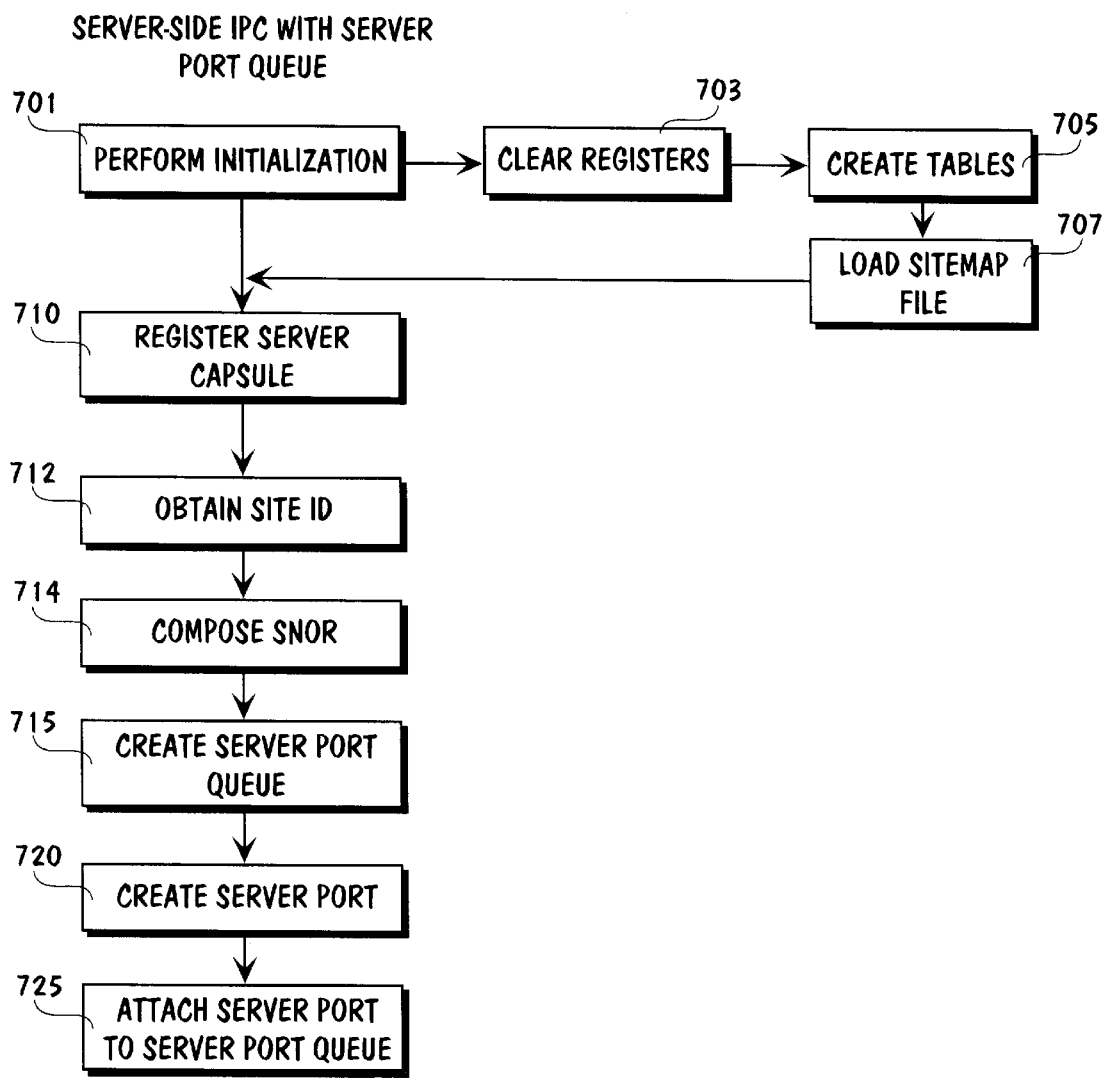
FIG. 9 is a graph defining speed variation (wow and flutter) as referred to herein.
Figure 10:
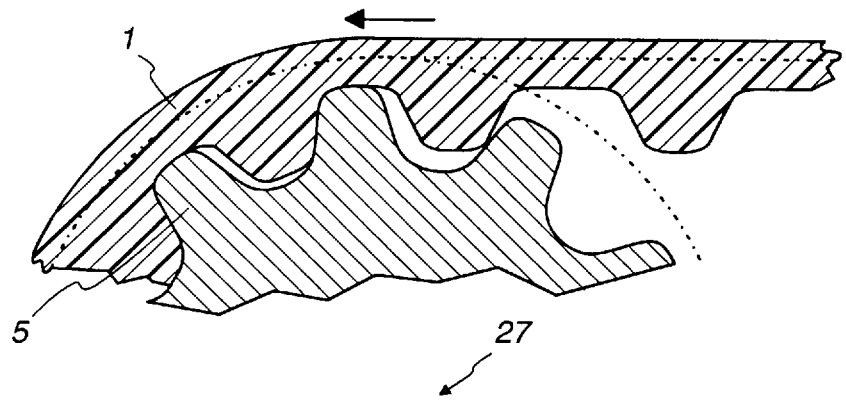
FIGS. 10–13 show sequentially the engagement between one inventive belt and pulley.
Figure 11:
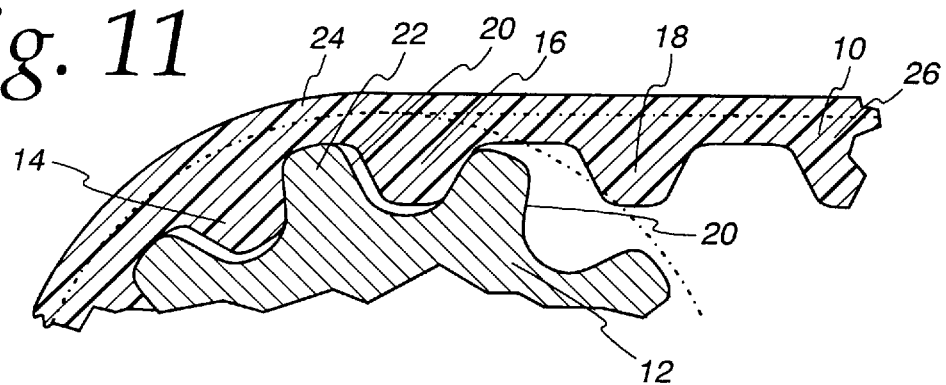
Figure 12:
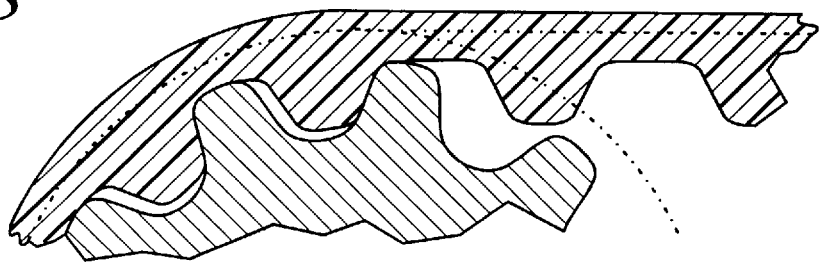
Figure 13:
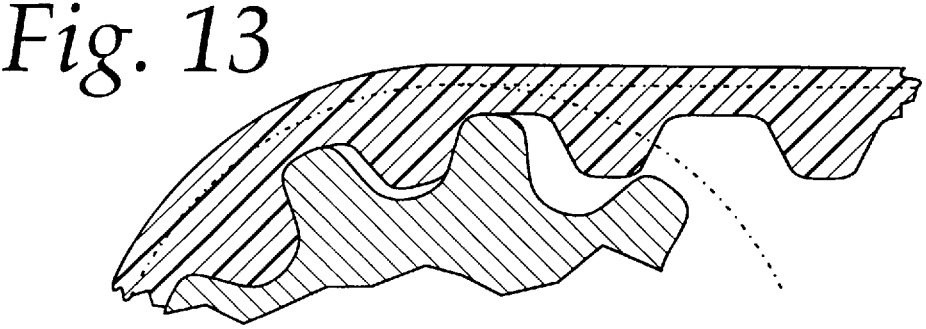
Figure 14:
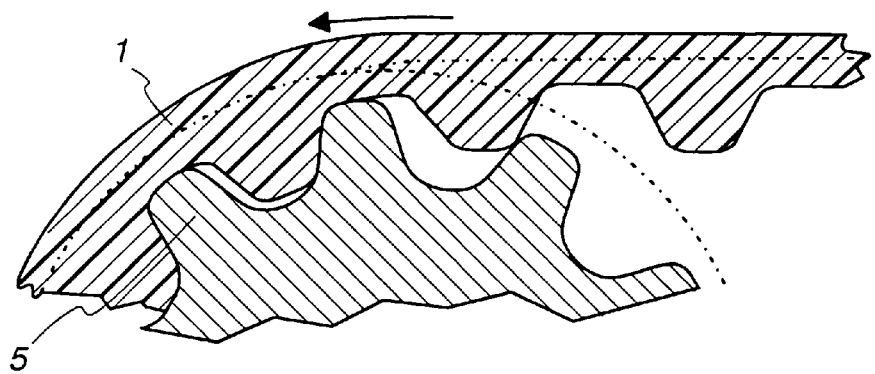
FIGS. 14–17 correspond to FIGS. 10–13 for a comparative belt sample.
Figure 15:
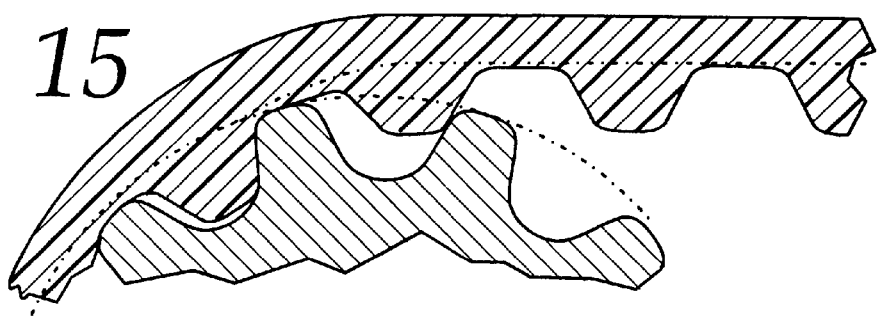
Figure 16:
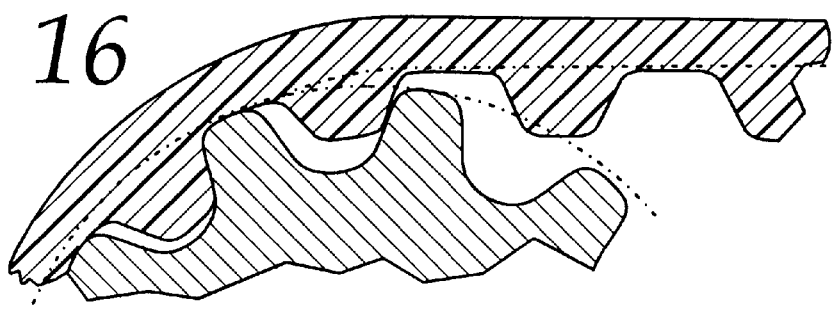
Figure 17:
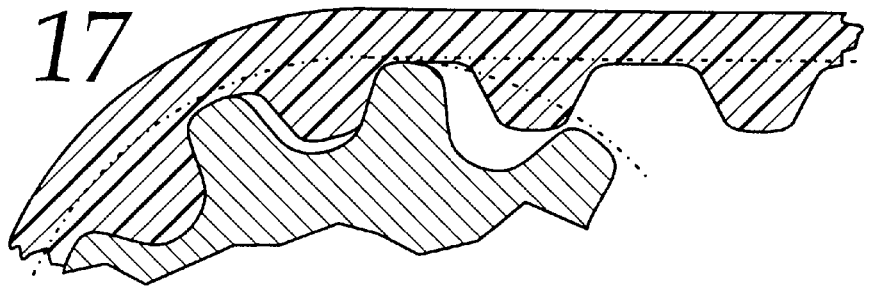
Figure 18:
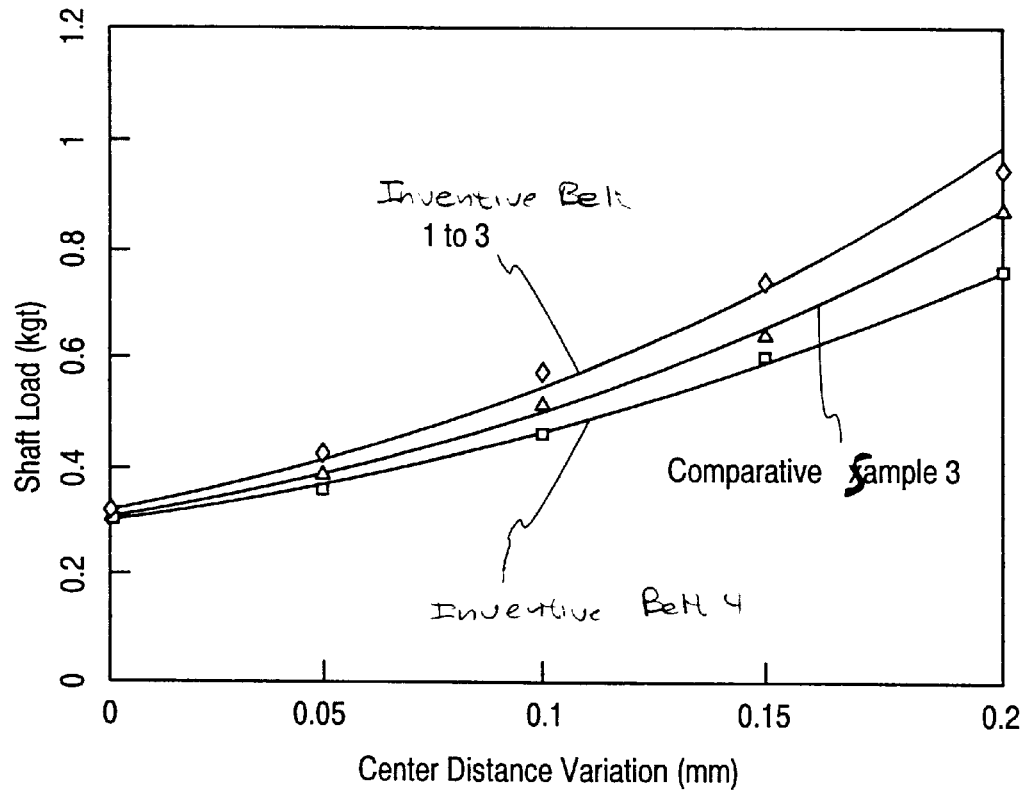
FIG. 18 is a graph showing the relationship between the cord center difference variation and shaft load.

Rigidity and staring torque were measured at different temperatures. The relationship between single pitch difference between each belt and pulley and speed variation was determined, with the results shown in Table 1 and FIG. 4. While measuring speed variation, the engagement between the belt and pulley teeth was observed through a high speed video monitor screen. This engagement is shown in FIGS. 9 and 10. The relationship between the center distance variation in each belt and axial applied load is shown in FIG. 18.

RIGIDITY OF BELT

As shown in FIG. 6, a strip 76 of belt was placed on a stand 78 of a bending rigidity tester 80. The tester 80 was placed in a conditioned chamber at a predetermined temperature. The belt strip 76 was situated so that the end 82 thereof projected in cantilever fashion beyond the edge of the stand 78 by a length of 10 belt teeth. A load was applied to the end 82 using a fan-shaped tension gauge 84 that was movable in a vertical direction through a motor 86 that operates a screw drive 88. The end 82 was bent through an angle θ to bring the end 82 into contact with the surface 90 on the stand 78. The scale on the tension gauge 84 was read once the end 82 contacted the surface 90.

STARTING TORQUE

Figure 7:
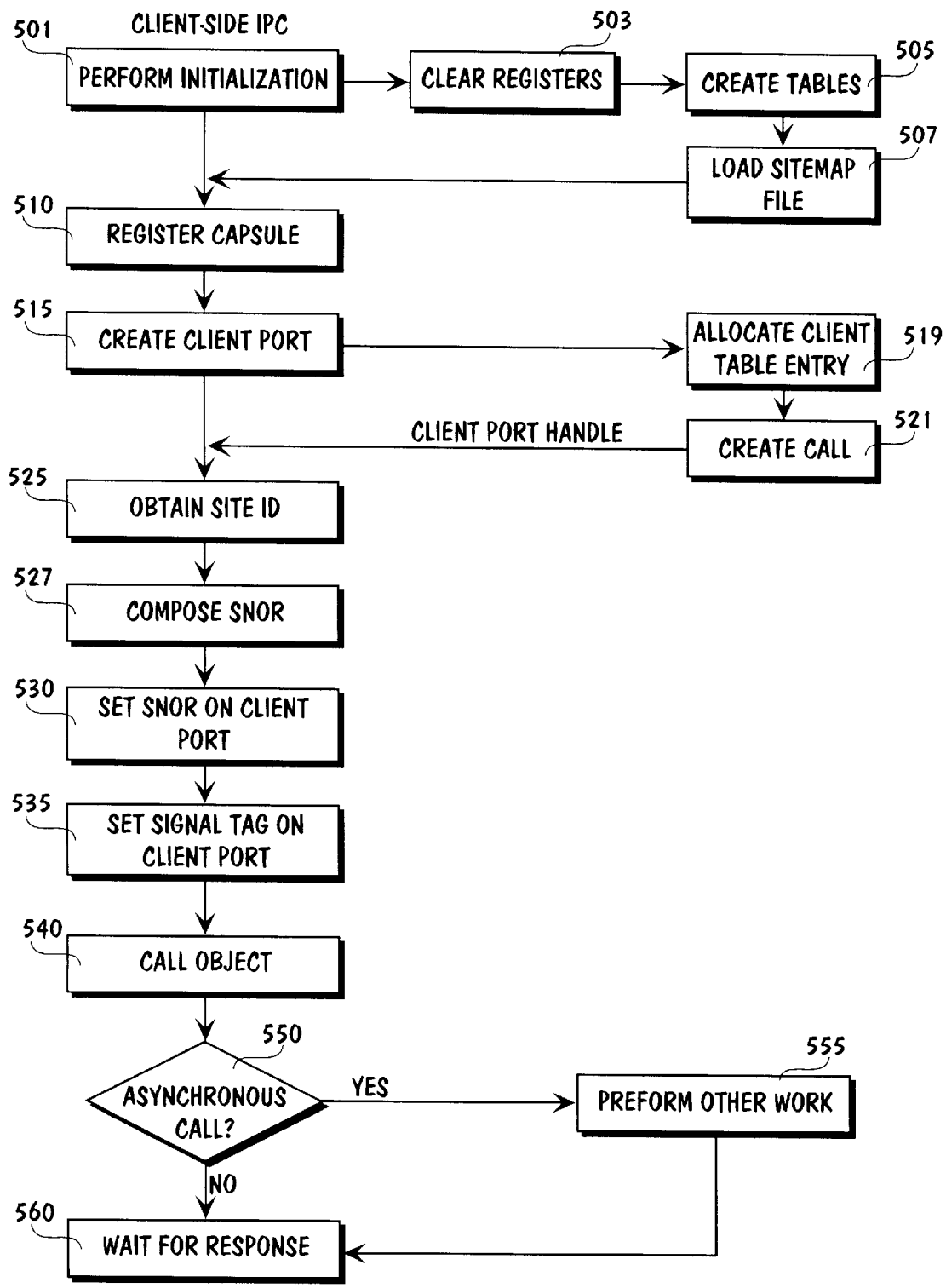
FIG. 7 is a schematic representation of a device for measuring starting torque for the inventive belt.

As seen in FIG. 7, the tested belts were trained around a drive pulley 94, having 20 teeth, and a movable, driven pulley 96, having 20 teeth, on a starting torque meter system 98. The meter system 98 was placed in a conditioned chamber at a predetermined temperature. The driven pulley 96 was operated to impart a tension of 300 gf to the belt. A shaft load of 600 gf was applied to the belt. A weight 100 was hung from the driven pulley 96. While increasing the weight 100, the minimum weight (W) under which the pulley began to rotate and the weight (W) moved downward by 5 cm was measured. The starting torque was obtained according to the following equation. Starting torque=(W−WO)×0.65.

Where WO is a weight under which the weight 100 is moved downwardly by 5 cm or more in the absence of the belt.

RELATIONSHIP BETWEEN THE SINGLE PITCH DIFFERENCE BETWEEN BELT AND PULLEY AND SPEED VARIATION

Figure 8A:
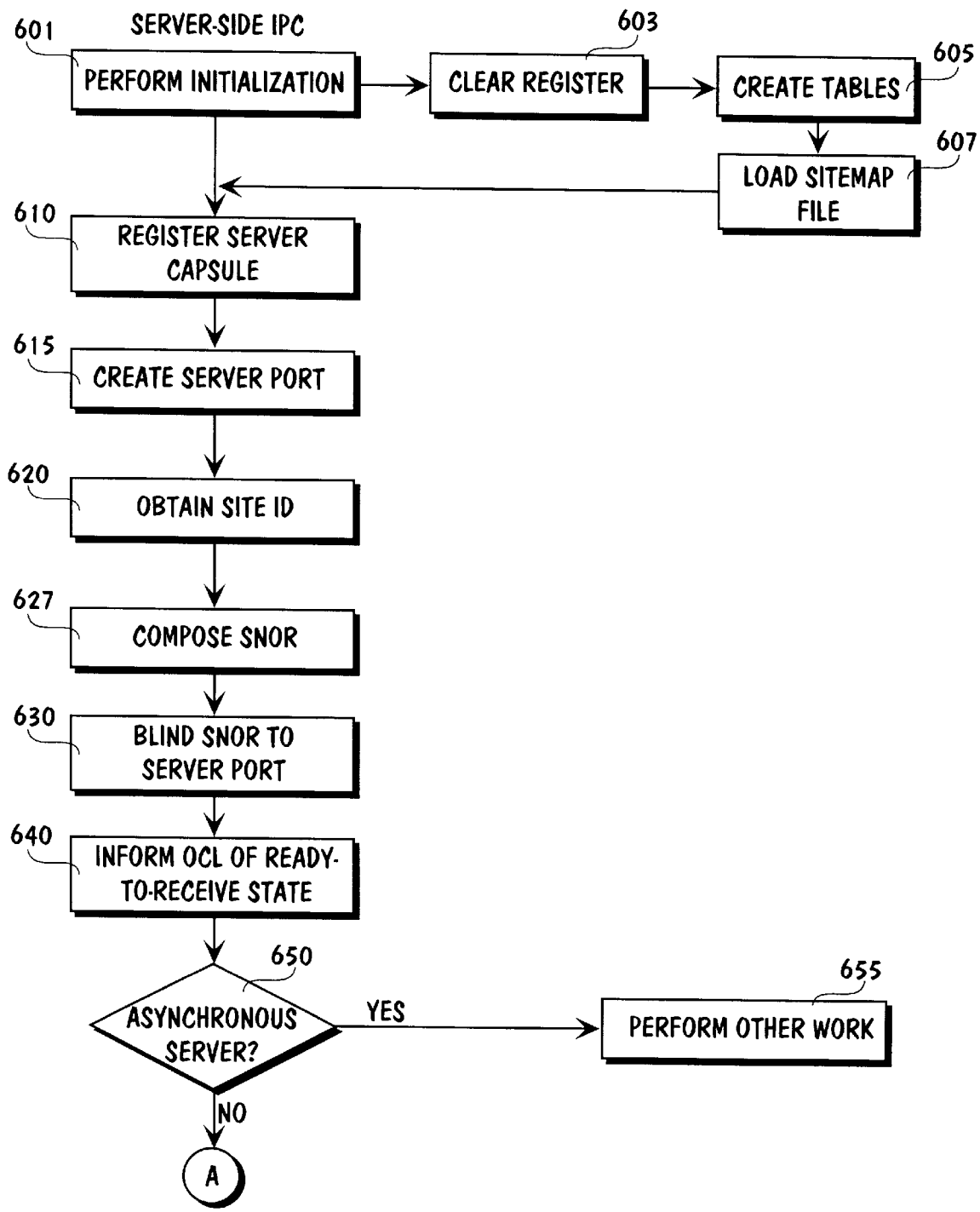
FIG. 8 is a schematic representation of device for measuring speed variation for the inventive belt.
Figure 8B:
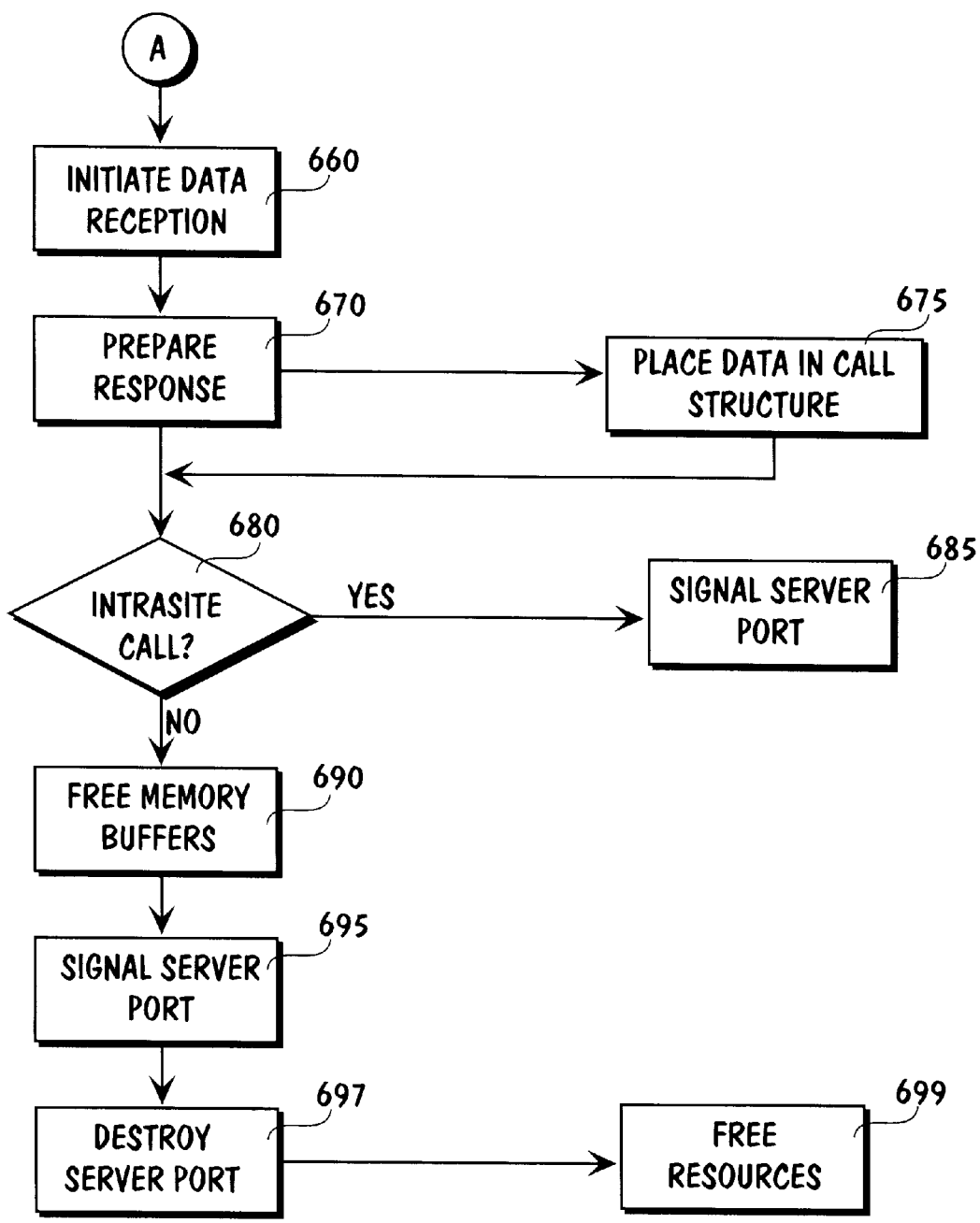

A speed variation measuring system is shown at 104 in FIG. 8. A belt (A) was trained around a drive pulley 106 and

TABLE 1

|  |  | Inventive Belts | | Comparative Samples | |
| --- | --- | --- | --- | --- | --- |
|  |  | 1 to 3 | 4 | 3 | 4 |
| Cords |  |  |  |  |  |
| Material |  | Aramid fibers | Aramid fibers | Glass fibers | Glass fibers |
| Monofilament |  | 0.75 d | 0.75 d | ECG-150- | ECG-150- |
| Constitution |  | 200 d/l | 200 d/l | 3/0 | 2/0 |
| Count of Single Twist (/10 cm) |  | 40 | 40 | 4 | 4 |
| Thickness of Cord (mm) |  | 0.15 | 0.15 | 0.25 | 0.20 |
| Cord Pitch (mm) |  | 0.31 | 0.44 | 0.52 | 0.52 |
| Rigidity of belt (gf) | 25° C. | 1.2 | 0.9 | 1.5 | 1.5 |
|  | −5° C. | 1.5 | 1.2 | 2.9 | 2.6 |
|  | −35° C. | 2.1 | 2.0 | 6.4 | 5.2 |
| Starting Torque (gcm) | 25° C. | 10.6 | 11.9 | 14.8 | 13.6 |
|  | 5° C. | 11.2 | 13.5 | 16.4 | 16.2 | a driven pulley 108. The driven pulley 108 was moved to impart a tension of 300 gf to the belt A, as a result of which a shaft load of 600 gf was applied to the belt A. The drive pulley 106 was rotated at 450 rpm, whereupon the dynamic shaft load was confirmed at 600 gf. After the shaft load was stabilized at a predetermined value, the speed fluctuation was measured with a speed fluctuation meter 110, with the data being inputted from a sensor 112. According to FFT31, the speed variation (wow and flutter) was calculated on the basis of the data measured.

INVENTIVE BELTS NOS. 1–3

For inventive belts 1–3, the single pitch of the belt was fixed at 2.032 mm. The pulleys for inventive belt No. 1 had an outer diameter of 6.09 mm with a 15 single pitch of 2.072 mm. With the inventive belt No. 1, the single pitch difference was −0.04 mm. The pulleys for inventive belt No. 2 had an outer diameter of 6.02 mm with a single pitch of 2.052 mm. With inventive belt No. 2, the single pitch difference was, therefore, −0.02 mm. The pulleys for inventive belt No. 3 had an outer diameter of 5.99 mm with a single pitch of 2.042 mm. Thus the single pitch difference was −0.01 mm.

COMPARATIVE SAMPLES NOS. 1 & 2

For comparative samples Nos. 1 and 2, the single pitch of the belt was fixed at 2.032 mm. The pulleys for comparative sample No. 1 had an outer diameter of 6.15 mm with a single pitch of 2.092 mm. In comparative sample No. 1, the single pitch difference was −0.06 mm. The pulleys for comparative sample No. 2 had an outer diameter of 5.93 mm with a single pitch of 2.022 mm. The single pitch difference for comparative sample No. 2 was thus 0.01 mm.

The speed fluctuation meter used to measure the speed variation was a non-contact speed fluctuation meter that utilizes Doppler effect of laser rays. The speed variation is represented by the percentage of the variation in the rotational speed V relative to the average rotational speed V0. This is defined by the following equation:

Speed variation (wow and flutter)−(V/V0)×100 (%)

Figure 4:
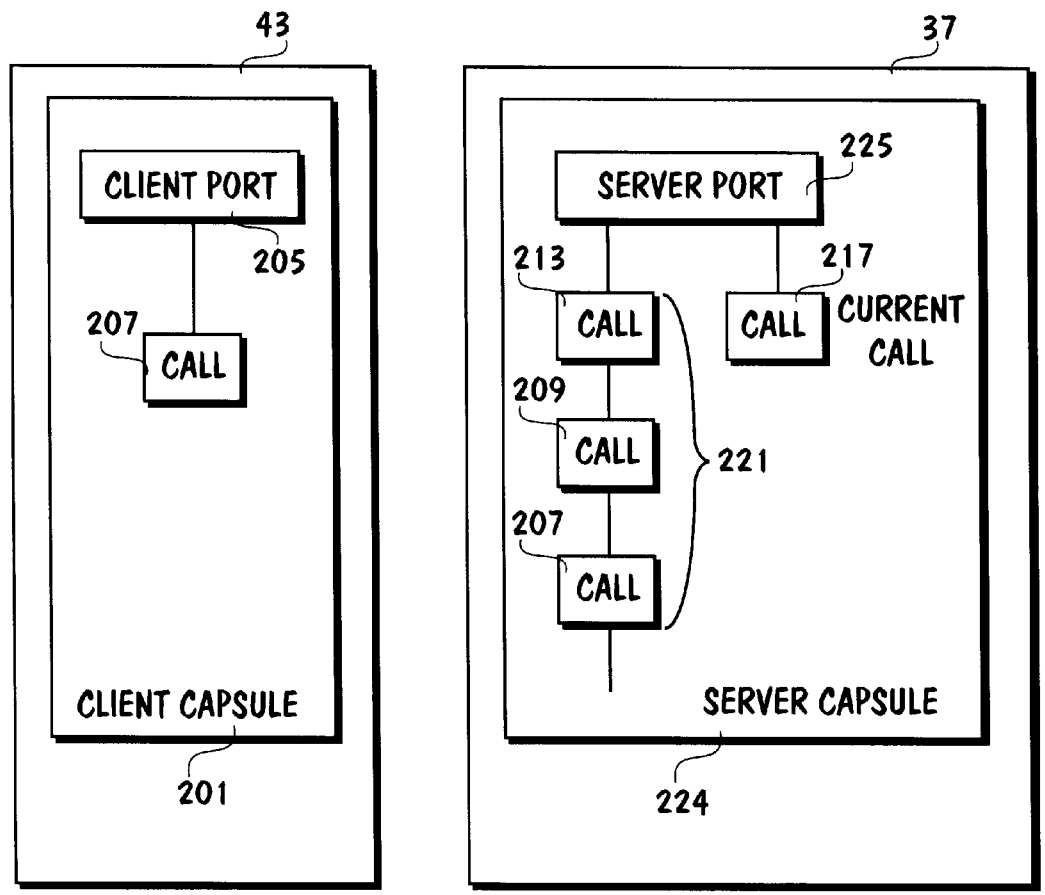
FIG. 4 is a graph showing the relationship between the single pitch difference between the belt teeth and the pulley grooves and the speed variation for different inventive and comparative belts in operation.
Figure 6A:
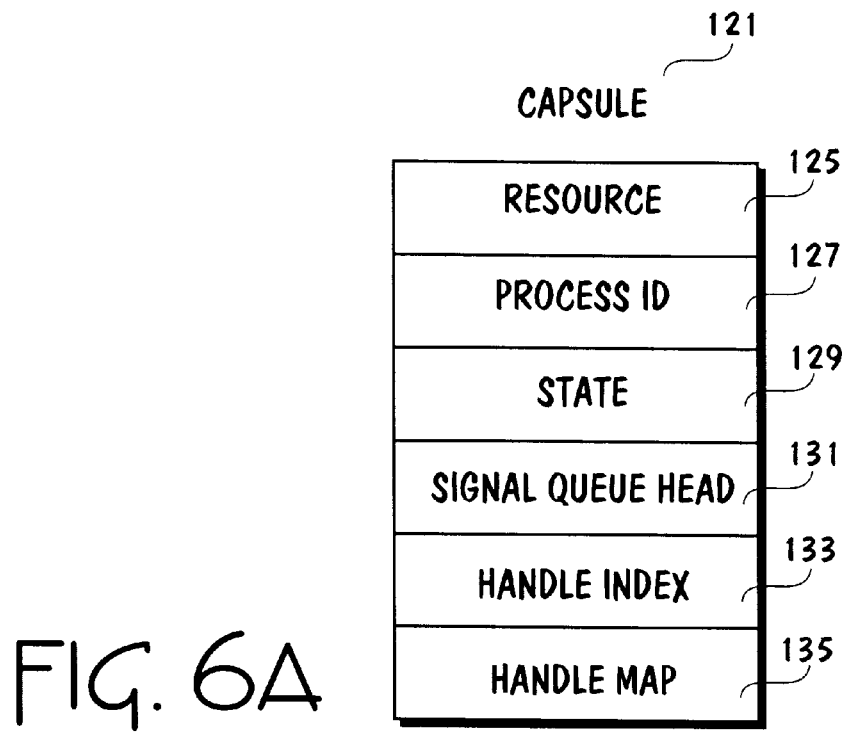
FIG. 6 is a schematic representation of a tester used for determining the bending rigidity of the inventive belt.
Figure 6B:
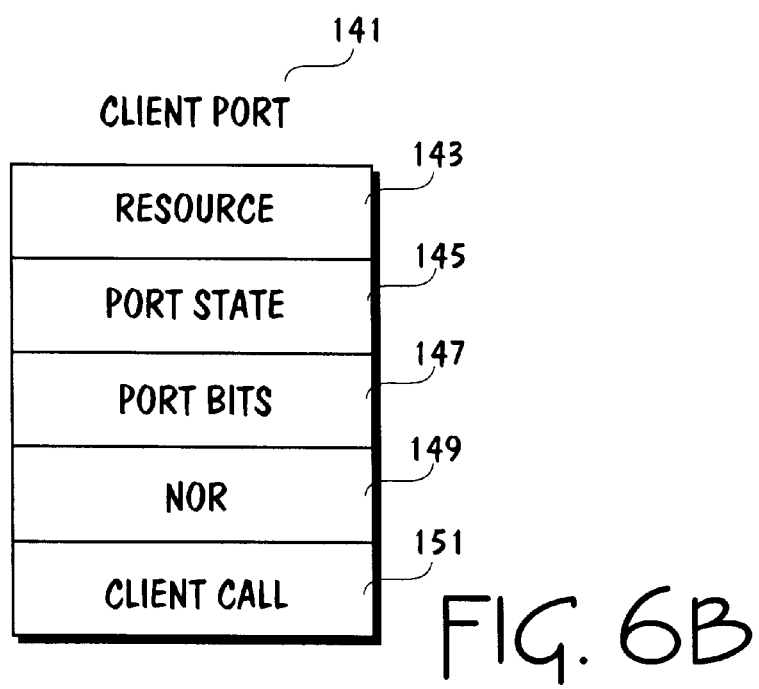
Figure 6C:
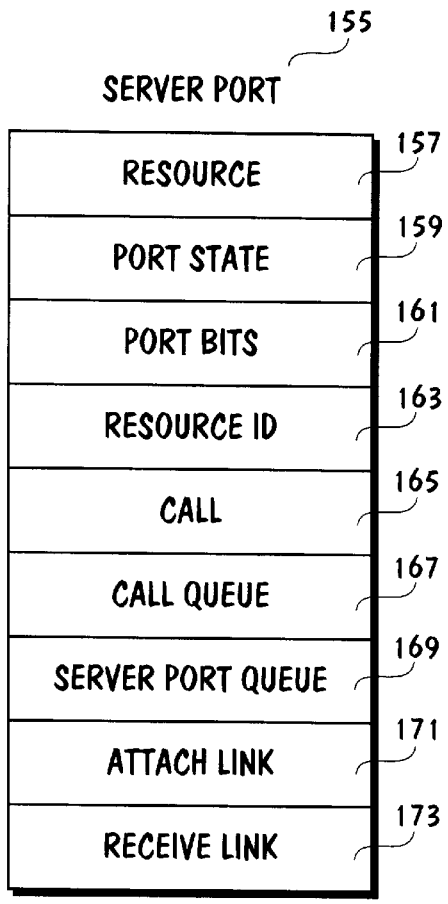
Figure 6D:
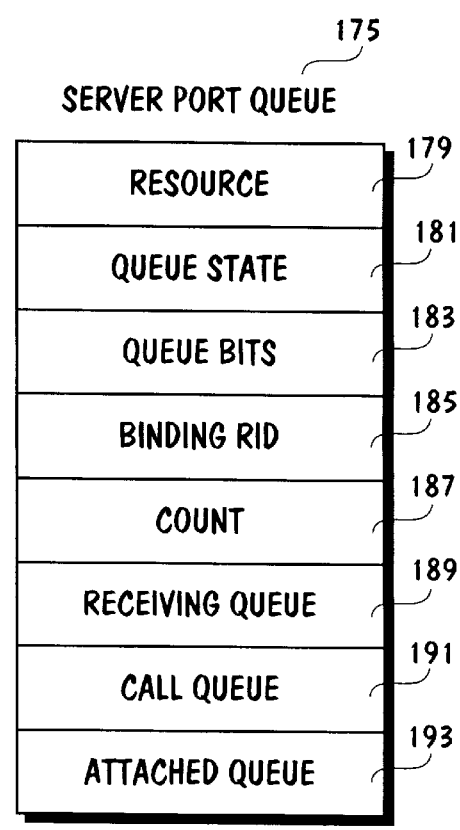

The speed variation in the belt with the pulleys was measured in the manner discussed above. The results are shown in FIG. 4. During measurement of the speed variation, the engagement between the belt teeth and the pulley grooves was monitored on a high speed video monitor screen. Sequence drawings of the engagement between the teeth and pulleys for the inventive belt No. 2 are shown in FIGS. 10–13, with corresponding drawings shown for comparative sample No. 2 in FIGS. 14–17. In these drawings, the change in the engagement between one belt tooth and one pulley groove from start of the engagement to the completion thereof is shown.

From these tests, it can be seen that the speed variation in the toothed belt driving systems of inventive belts Nos. 1–3 was not higher than 1.5% while that in the systems of comparative samples Nos. 1 and 2 was more than 1.7%. It has been found that if the speed variation is greater than 1.7%, the printing accuracy and the travelling accuracy are unsatisfactory. The driving systems with inventive belt Nos. 1–3 showed good printing and travelling accuracy.

Referring to sequence drawings 10–17, it can be seen that the engagement of inventive belt No. 2 with the pulleys (FIGS. 10–13) is smoother than the engagement with comparative sample No. 2 (FIGS. 14–17). That is, the interference between the side of each belt tooth and that of the cooperating pulley groove of the inventive belt No. 2 is less than that for comparative sample No. 2. The smoother engagement accounts for lower speed variation for the belt in operation.

COMPARATIVE SAMPLE NOS. 3 AND 4

Glass fiber filaments having a diameter of about 9 mm were bundled up to form strands which were then dipped in an RFL liquid and dried at 250° C. for two minutes. A predetermined number of these strands were twisted together with four twists per 10 cm to prepare glass fiber cords. The cords were ECG-150-3/0 (with a diameter of 0.25 mm) and ECG-150-2/0 (with a diameter of 0.2 mm).

The rigidity and starting torque of the belts were measured at different temperatures using the methods described above. The results obtained are shown in Table 1.

The foregoing disclosure of specific embodiments is intended to be illustrative of the broad concepts comprehended by the invention.

We claim:

1. A drive system comprising:

a belt having a length and a plurality of teeth spaced regularly along the length of the belt; and a first pulley having a plurality of grooves for receiving the belt teeth with the belt and first pulley in operative relationship, wherein the single pitch difference between the belt teeth and the grooves in the first pulley is controlled to be between −0.04 mm and 0 mm.

2. The drive system according to claim 1 in combination with a second pulley having a plurality of grooves for receiving the belt teeth with the belt and second pulley in operative relationship, the belt being trained for movement in a continuous path around the first and second pulleys with the first and second pulleys and belt in the operative relationship, and the single pitch difference between the belt teeth and the grooves in the second pulley is between −0.04 mm and 0 mm.

3. The drive system according to claim 1 wherein the belt has an inside and an outside, the teeth on the belt have a height between the inside and outside of the belt, the first pulley has a rotational axis, the grooves in the first pulley have a depth in a radial direction relative to the rotational axis of the first pulley, and the ratio of the height of the belt teeth to the depth of the grooves in the first pulley is between 1.00 and 1.20.

4. The drive system according to claim 1 wherein the belt teeth and the grooves in the first pulley each have a trapezoidal shape as viewed in cross section.

5. The drive system according to claim 1 wherein the belt comprises a body and there are load carrying cords embedded in the body and extending in a lengthwise direction.

6. The drive system according to claim 5 wherein the load carrying cords comprise aramid fibers.

7. The drive system according to claim 6 wherein the load carrying cords each comprise at least one bundle of monofilament aramid fibers each of 0.5–2.0 denier that are single twisted to produce load carrying cords having a diameter of 0.10–0.20 mm.

8. The drive system according to claim 5 wherein the belt body has a lateral dimension and the load carrying cords have centers spaced laterally of the belt body between 0.2 mm and 0.5 mm.

9. The drive system according to claim 1 wherein the belt comprises a body with an inside and an outside, the teeth are on the inside of the belt body and there is a cloth layer on the inside of the belt body which has openings therethrough and the cloth layer has a treating substance thereon that substantially blocks the openings.

10. The drive system according to claim 9 wherein the treating substance comprises resorcinol-formalin-latex.

11. The drive system according to claim 9 wherein the cloth layer comprises a canvas cloth that comprises at least one of 6-nylon, 66-nylon, polyester, and aramid fiber.

12. The drive system according to claim 9 wherein the treating substance is resorcinol-formalin-latex and only resorcinol-formalin-latex that is applied as a liquid and adhered in an amount equal to 20–50% by weight.

13. The drive system according to claim 1 wherein the single pitch difference between the belt teeth and the grooves in the first pulley is between −0.02 mm and 0 mm.

14. The drive system according to claim 1 wherein the belt has a body comprising rubber that comprises at least one of chloroprene rubber, natural rubber, millable urethane rubber, hydrogenated nitrile rubber, chlorosulfonated polyethylene (CSPE), and alkylated, chlorosulfonated polyethylene rubber (ACSPE).

* * * * *